(12) United States Patent
Betaille-Francoual et al.

(10) Patent No.: US 10,753,853 B2
(45) Date of Patent: Aug. 25, 2020

(54) METHOD OF EVALUATING THE CORROSION RESISTANCE OF A COATED METAL SUBSTRATE

(71) Applicants: ARIANEGROUP SAS, Paris (FR); SAFRAN HELICOPTER ENGINES, Bordes (FR)

(72) Inventors: Marie Betaille-Francoual, Le Haillan (FR); Loïc Oger, Neuilly-sur-Marne (FR); Anaïs Lecaplain, Saint-Planchers (FR)

(73) Assignees: ARIANEGROUP SAS, Paris (FR); SAFRAN HELICOPTER ENGINES, Bordes (FR)

( * ) Notice: Subject to any disclaimer, the term of this patent is extended or adjusted under 35 U.S.C. 154(b) by 248 days.

(21) Appl. No.: 15/758,585

(22) PCT Filed: Sep. 9, 2016

(86) PCT No.: PCT/FR2016/052263
§ 371 (c)(1),
(2) Date: Mar. 8, 2018

(87) PCT Pub. No.: WO2017/042503
PCT Pub. Date: Mar. 16, 2017

(65) Prior Publication Data
US 2018/0252632 A1  Sep. 6, 2018

(30) Foreign Application Priority Data
Sep. 9, 2015 (FR) ...................................... 15 58368

(51) Int. Cl.
*G01N 17/02* (2006.01)
*G01N 17/00* (2006.01)

(52) U.S. Cl.
CPC .................................. *G01N 17/006* (2013.01)

(58) Field of Classification Search
CPC ........ G01N 17/00; G01N 21/27; B01F 13/00; C12Q 1/527; H04L 12/40163;
(Continued)

(56) References Cited

U.S. PATENT DOCUMENTS

2003/0068824 A1* 4/2003 Frankel ................ G01N 17/006
  436/60
2013/0020335 A1* 1/2013 Schmidt .................. C04B 35/14
  220/660

OTHER PUBLICATIONS

International Search Report as issued in International Patent Application No. PCT/FR2016/052263, dated Oct. 26, 2016.
(Continued)

*Primary Examiner* — Lyle Alexander
*Assistant Examiner* — Michael Paul Shimek
(74) *Attorney, Agent, or Firm* — Pillsbury Winthrop Shaw Pittman LLP

(57) ABSTRACT

A method of evaluating the corrosion resistance of a coated metal substrate, the method including putting a liquid composition into contact with a corrosion protection coating present on the surface of a metal substrate, the liquid composition including water, a gelling agent, corrosion-catalyst ions, and a color pH indicator; gelling the liquid composition in order to form a corrosion-accelerator gel in contact with the coating; performing a corrosion test during which the gel that has formed is left in contact with the corrosion protection coating; and evaluating the corrosion resistance of the substrate coated by the corrosion protection coating by observing the color of the color pH indicator present in the gel after performing the corrosion test.

10 Claims, 12 Drawing Sheets

(58) Field of Classification Search
CPC ... H04L 41/06; H04L 12/40019; H04L 67/12; G07C 5/008; G07C 5/0808; G07C 2205/02
See application file for complete search history.

(56) References Cited

OTHER PUBLICATIONS

Database Compendex {Online] Engineering Information, Inc., Jul. 1933, Prot, et al., "Determination of heterogeneity and resistance to corrosion of metals," XP002755861, vol. 197, No. 2, Database accession No. XP008181961.

* cited by examiner

METHOD OF EVALUATING THE CORROSION RESISTANCE OF A COATED METAL SUBSTRATE

CROSS REFERENCE TO RELATED APPLICATIONS

This application is the U.S. National Stage of PCT/FR2016/052263 filed Sep. 9, 2016, which in turn claims priority to French Application No. 1558368, filed Sep. 9, 2015. The contents of both applications are incorporated herein by reference in their entirety.

BACKGROUND OF THE INVENTION

The invention relates in particular to a method of evaluating the corrosion resistance of a metal substrate coated with a corrosion protection coating.

It is known to perform a salt spray test in order to evaluate the corrosion resistance of a metal substrate coated with a corrosion protection coating. By way of example, the performance of such a test is described in the ISO 9227 standard. In that type of test, the coated substrate is present in a treatment chamber in which a salt solution is sprayed. Such a test takes a relatively long time to perform: more than one week for characterizing a chemical conversion coating, nearly two weeks for an anodized coating, and about six weeks for a paint.

There therefore exists a need to have a method of evaluating the corrosion resistance of a coated metal substrate that can be performed relatively quickly and at low cost.

There also exists a need to simplify existing methods of evaluating the corrosion resistance of coated metal substrates.

OBJECT AND SUMMARY OF THE INVENTION

To this end, in a first aspect, the invention proposes a method of evaluating the corrosion resistance of a coated metal substrate, the method comprising at least the following steps:

putting a liquid composition into contact with a corrosion protection coating present on the surface of a metal substrate, the liquid composition comprising water, a gelling agent, corrosion-catalyst ions, and a color pH indicator;

gelling the liquid composition in order to form a corrosion-accelerator gel in contact with the coating;

performing a corrosion test during which the gel that has formed is left in contact with the coating; and evaluating the corrosion resistance of the substrate coated by the corrosion protection coating by observing the color of the color pH indicator present in the gel after performing the corrosion test.

The metal substrate may comprise aluminum, and for example it may be made of an aluminum alloy. In a variant, the metal substrate may comprise iron, titanium, or magnesium. By way of example, the metal substrate may be made of a steel.

By using a corrosion-accelerator gel, the invention proposes a method of evaluating corrosion resistance that can be performed relatively quickly and that presents a reduced cost of performance. In particular, the invention makes it possible to evaluate the corrosion resistance of substrates coated with a corrosion protection coating in a manner that is much faster than the salt spray test. In addition, the method makes it possible to monitor the appearance of corrosion continuously and thus to determine accurately the time to the appearance of the first corrosion. The ability to monitor the appearance of corrosion continuously constitutes an additional advantage compared with the salt spray test, in which inspecting the substrate requires the treatment chamber to be opened, thereby greatly limiting the frequency with which this inspection can be performed. Putting the coating into contact with the corrosion-accelerator gel produces corrosion pits on the coated metal substrate, which pits can be detected as a result of a change in the color of the color pH indicator. Specifically, during the corrosion pit reaction, anodic zones and cathodic zones are formed at the surface of the metal substrate. For a metal substrate comprising aluminum, the following chemical reactions take place:

reactions that take place in the anodic zones: $Al \rightarrow Al^{3+} + 3e^-$ and $Al^{3+} + H_2O \rightarrow AlOH^{2+} + H^+$; and reaction that takes place in the cathodic zones: $O_2 + 2H_2O + 4e^- \rightarrow 4OH^-$.

Consequently, the gel is acidified in the anodic zones and alkalized in the cathodic zones during the corrosion test. The corrosion pits thus produce a change of pH that can be detected as a result of the change in the color of the color pH indicator that is present in the gel. The gel thus incorporates both water with corrosion-catalyst ions for corroding the coated substrate, and also the color pH indicator serving to detect the presence of corrosion pits as a result of changing color, thus making it possible to deduce the performance of the protection coating present on the surface of the substrate.

In an implementation, the corrosion-catalyst ions may be selected from: chlorine ions, sulfide ions, sulfate ions, fluoride ions, and mixtures thereof.

In an implementation, the method may comprise, before putting the liquid composition into contact with the coating, a step of forming the corrosion protection coating on the metal substrate by performing at least one of the following treatments: chemical conversion treatment; anodizing treatment; depositing a corrosion protection paint; a sol-gel method; cadmium plating; depositing a zinc-nickel coating.

By way of example, the liquid composition may be gelled by cooling the composition.

In an implementation, the concentration of corrosion-catalyst ions in the liquid composition may lie in the range 4 moles per liter (mol/L) to 6 mol/L.

In an implementation, the volume content of color pH indicator in the liquid composition may lie in the range 2% to 15%.

In an implementation, the concentration of the gelling agent in the liquid composition may lie in the range 1 gram per liter (g/L) to 200 g/L, e.g. lying in the range 4 g/L to 16 g/L.

In an implementation, at the end of the corrosion test, it is possible to count the number of zones where the color pH indicator has changed color in order to deduce the number of corrosion pits that appear by the end of a given duration, and thereby deduce an evaluation for the corrosion resistance of the coated substrate. The counting may be performed using an image analysis system or with the naked eye.

The present invention also provides a liquid composition for use in a method as described above, the composition comprising at least:

water;

corrosion-catalyst ions selected from: chloride ions; sulfide ions; sulfate ions; fluoride ions; and mixtures thereof;

a gelling agent; and a color pH indicator.

The liquid composition may be obtained by adding the corrosion-catalyst ions, the gelling agent, and the color pH indicator to demineralized water.

In an embodiment, at least one of the following conditions may be satisfied:

the concentration of gelling agent in the composition lies in the range 1 g/L to 200 g/L, e.g. in the range 4 g/L to 16 g/L;

the volume content of color pH indicator in the composition lies in the range 2% to 15%; and the concentration of corrosion-catalyst ions in the composition lies in the range 4 mol/L to 6 mol/L.

In particular, all three of the above-mentioned conditions may be satisfied.

The present invention also provides a kit for preparing a composition as described above, the kit comprising at least:

a gelling agent;

a water soluble or miscible compound including chlorine, sulfur, or fluorine; and a color pH indicator.

The water soluble or miscible compound may for example be sodium chloride (NaCl), sodium sulfide ($Na_2S$), or sulfuric acid ($H_2SO_4$). The compound is for providing corrosion-catalyst ions when it is mixed with water.

BRIEF DESCRIPTION OF THE DRAWINGS

Other characteristics and advantages of the invention appear from the following description given with reference to the accompanying drawings, in which.

DETAILED DESCRIPTION OF IMPLEMENTATIONS

A gellable liquid composition may initially be prepared by adding a compound including chlorine, sulfur, or fluorine to demineralized water. The compound is soluble or miscible in water in order to provide corrosion-catalyst ions in solution. A color pH indicator and a gelling agent are then added to the mixture. The temperature of the mixture may be high in order to facilitate dissolving the gelling agent. By way of example, the gelling agent may be selected from: gelling agents formed from seaweed extracts, in particular carraghenans or agar-agar; gums, e.g. gellan gum; starch; chitosan; gelatin; and mixtures thereof. The color pH indicator has the property of changing color as a function of pH. It is possible to use a commercial pH indicator or to obtain the color indicator by extracting a natural dye. In order to form the color pH indicator, it is also possible to use a mixture of the following type:

ethanol;
thymol blue;
methyl red;
bromothymol blue;
phenolphthalein;
water; and
sodium hydroxide.

Figure 1A:
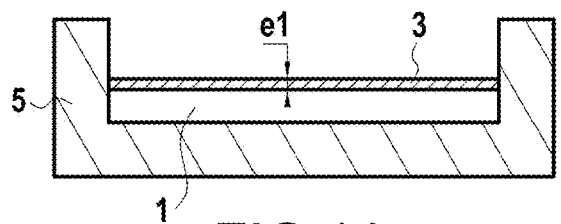
FIGS. 1A to 1E are diagrams showing different steps in a method of the invention.

A metal substrate 1 coated with a corrosion protection coating 3 is present in a container 5 as shown in FIG. 1A. By way of example, the metal substrate may be formed by an aluminum alloy, e.g. selected from aluminum alloys for forging, e.g. of the 2000, 3000, or 7000 series, or from aluminum alloys for casting. By way of example, the corrosion protection coating 3 may be formed by anodizing, by chemical conversion, or by depositing one or more layers of corrosion protection paint. Such techniques for forming a corrosion protection coating are themselves well known. The thickness $e_1$ of the corrosion protection coating 3 may for example be greater than or equal to 50 nanometers (nm), and for example may lie in the range 50 nm to 200 micrometers (μm).

Figure 1B:
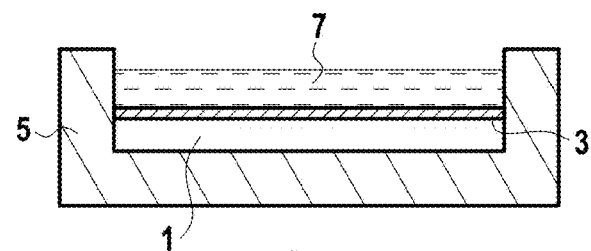
Figure 1C:
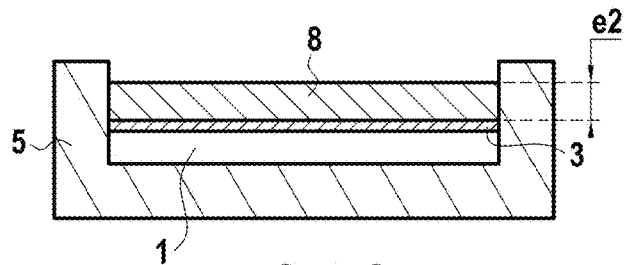
Figure 1D:
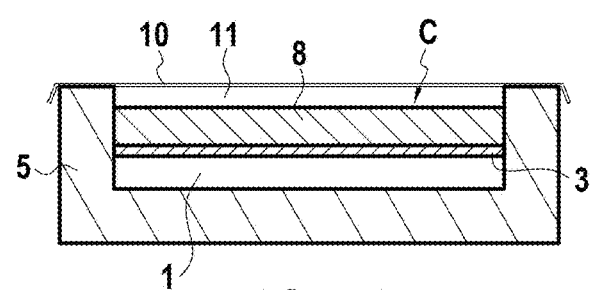

The gellable liquid composition 7 is then applied on the corrosion protection coating 3 so as to be in contact therewith, as shown in FIG. 1B. The gelling agent is dissolved in the liquid composition 7. Thereafter, the liquid composition 7 is cooled so as to be gelled, thereby obtaining a layer of corrosion-accelerator gel 8 in contact with the coating 3 (see FIG. 1C). By way of example, the thickness $e_2$ of the resulting layer of corrosion-accelerator gel 8 may be greater than or equal to 1 millimeter (mm), and for example may lie in the range 1 mm to 6 mm.

Figure 1E:
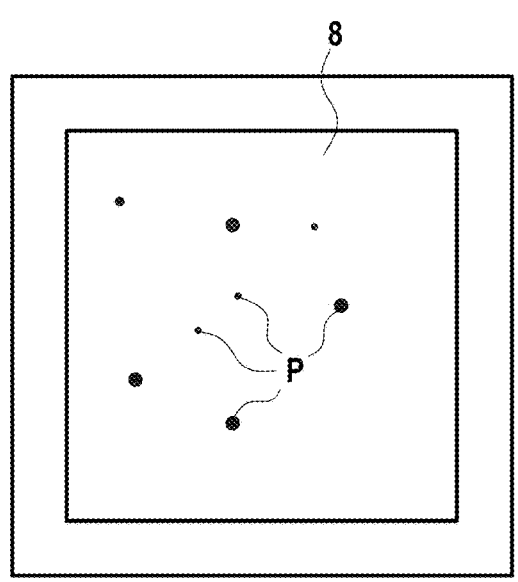

Thereafter, the container 5 is closed once the gel 8 has formed so as to hold the gel 8 and the coated substrate in a sealed chamber C during the corrosion test. This sealing serves advantageously to avoid the gel dehydrating. The container 5 may be closed by a transparent film 10, e.g. made of transparent plastics material. Once the container has been closed, the gel 8 is left in contact with the protection coating 3 present on the surface of the substrate 1 in order to perform the corrosion test. During the corrosion test, the gel 8 is also in contact with a volume of air 11 that serves to provide oxygen. In a variant that is not shown, the container need not be closed and the assembly comprising the gel and the coated substrate may be placed in a humid environment in order to perform the corrosion test. The water and the corrosion-catalyst ions serve to produce local corrosion pits giving rise to a change of pH during the corrosion test. The change in pH is detected by the color pH indicator that is present in the gel 8 since it changes color. A diagrammatic representation of the result that is obtained after performing a corrosion test is shown in FIG. 1E. The appearance of corrosion pits P can be observed as revealed by a change in the color of the color pH indicator. It is possible to count the corrosion pits P by an image analysis method or with the naked eye in order to evaluate the corrosion resistance of the coated substrate.

A temperature lower than or equal to 35° C., e.g. lying in the range 18° C. to 25° C. may be imposed throughout all or part of the corrosion test. By way of example, the corrosion test may be performed at ambient temperature (20° C.). The corrosion test may be performed at atmospheric pressure (1 bar).

The duration of the corrosion test may be less than or equal to 1000 hours (h), e.g. less than or equal to 48 h, and for example lying in the range 6 h to 48 h.

The corrosion test serves to evaluate the performance of a corrosion protection coating that has been formed on the surface of the metal substrate, but it would not go beyond the ambit of the invention if the corrosion test were performed in order to evaluate the performance of a protective coating that had previously been subjected to degradation treatment, such as heat treatment, e.g. in an oxidizing atmosphere, or contamination treatment, e.g. with oil or grease.

Figure 2:
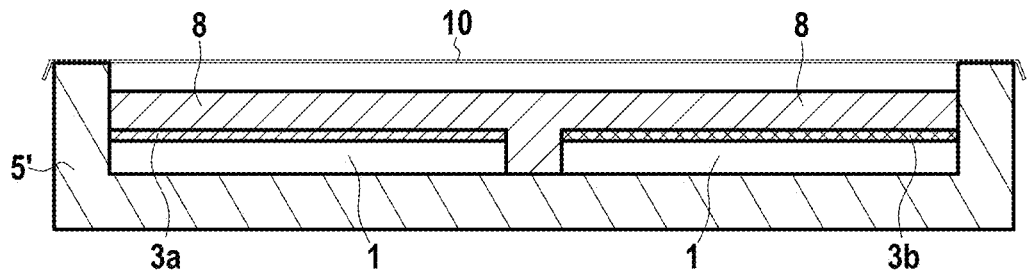
FIG. 2 is a diagram showing a variant method of the invention.

In the example of FIGS. 1A-E, the corrosion test is carried out on a single metal substrate. FIG. 2 shows a variant in which a plurality of substrates 1 of the same kind are present in the container 5'. Each of the substrates 1 presents a different corrosion protection coating 3a or 3b. A corrosion test is performed during which the same corrosion-accelerator gel 8 is left in contact with each of the coatings 3a and 3b. Such a test serves to compare the corrosion protection performance of each of the coatings 3a and 3b. By way of example, the coating 3a may have been subjected to degradation heat treatment, e.g. in an oxidizing atmosphere, while the coating 3b may correspond to the coating 3a prior to performing the degradation treatment. The method of the invention can thus be used to evaluate the impact of degradation treatments on corrosion resistance performance. In a variant, the coating 3a is formed on the surface of the metal substrate 1 by applying a first treatment, e.g. by chemical conversion, while the coating 3b is formed on the surface of the metal substrate 1 by performing second treatment that is different from the first, e.g. by anodizing.

In a variant, it is also possible to perform a corrosion test involving a plurality of substrates of different kinds, each presenting a corrosion protection coating. Under such circumstances, the corrosion protection coatings may be identical or different.

Figure 3:
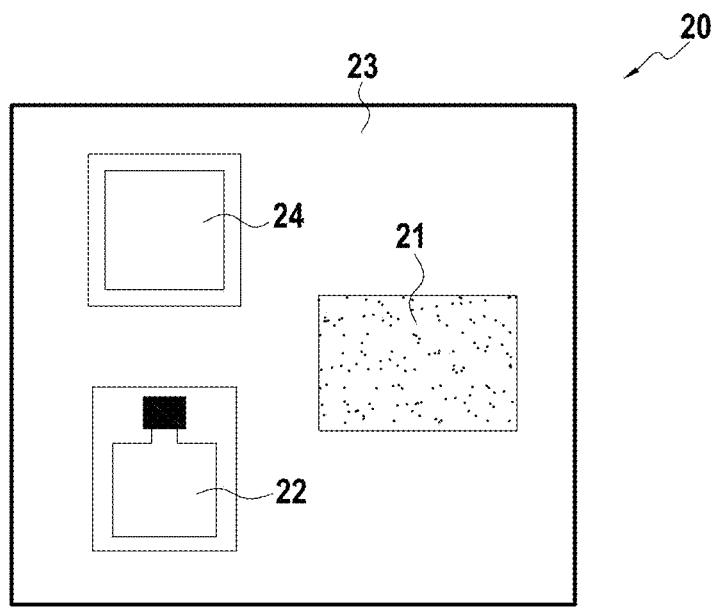
FIG. 3 is a diagram showing an example of a kit of the invention.

FIG. 3 shows an example of a kit 20 of the invention comprising, on a single support 23, a gelling agent 24, a bottle 22 containing a color pH indicator, and sodium chloride (NaCl) 21. The gelling agent 24, the bottle 22, and the sodium chloride 21 are each present in a compartment of the kit 20. By way of example, these three ingredients may be present in different compartments as shown in FIG. 3. This kit 20 has three ingredients that are capable, when mixed in water, of forming a gellable liquid composition as described above.

EXAMPLES

Example 1: Implementing a Liquid Composition Including a Color pH Indicator Based on Red Cabbage (Natural Dye)

Initially, a color pH indicator solution based on red cabbage was prepared by performing the following protocol:
immersing 100 grams (g) of red cabbage leaves in 1000 milliliters (mL) of demineralized water;
increasing the temperature of the mixture up to 80° C. for 15 minutes (min);
then allowing the mixture comprising water and cabbage leaves to cool down to ambient temperature (20° C.); and
removing the cabbage leaves from the cooled mixture so as to obtain the solution including the color pH indicator based on red cabbage.

A gellable liquid composition was then prepared as follows:
23.85 g of table salt (NaCl) were added to 100 mL of demineralized water and were dissolved under vigorous stirring;
15 mL of color pH indicator based on red cabbage were then added to the mixture of salt and water after the salt had dissolved;
0.5 g of an agar-agar powder provided by the supplier Vahiné were then added cold by gentle dusting in order to avoid the powder agglomerating; and
the temperature of the resulting mixture was then increased progressively up to 80° C. in order to encourage dissolution of the agar-agar, and while the temperature was rising, stirring was diminished once the temperature reached 50° C. in order to avoid forming bubbles in the mixture and foam on the surface.

The mixture obtained at a temperature of 80° C. was immediately poured onto testpieces made of aluminum alloy of the 7000 series and covered in a corrosion protection coating obtained by chemical conversion treatment based on hexavalent chromium. The testpieces were present in a support allowing the gel to be poured into it. The testpieces and the support had previously been degreased.

The mixture as applied in this way was then allowed to cool for about 5 min to ambient temperature so as to gel and obtain a layer of corrosion-accelerator gel having a thickness of about 1 mm. The support containing the testpieces and the gel as formed in this way was covered in a plastics film so as to prevent the gel dehydrating.

Figure 4A:
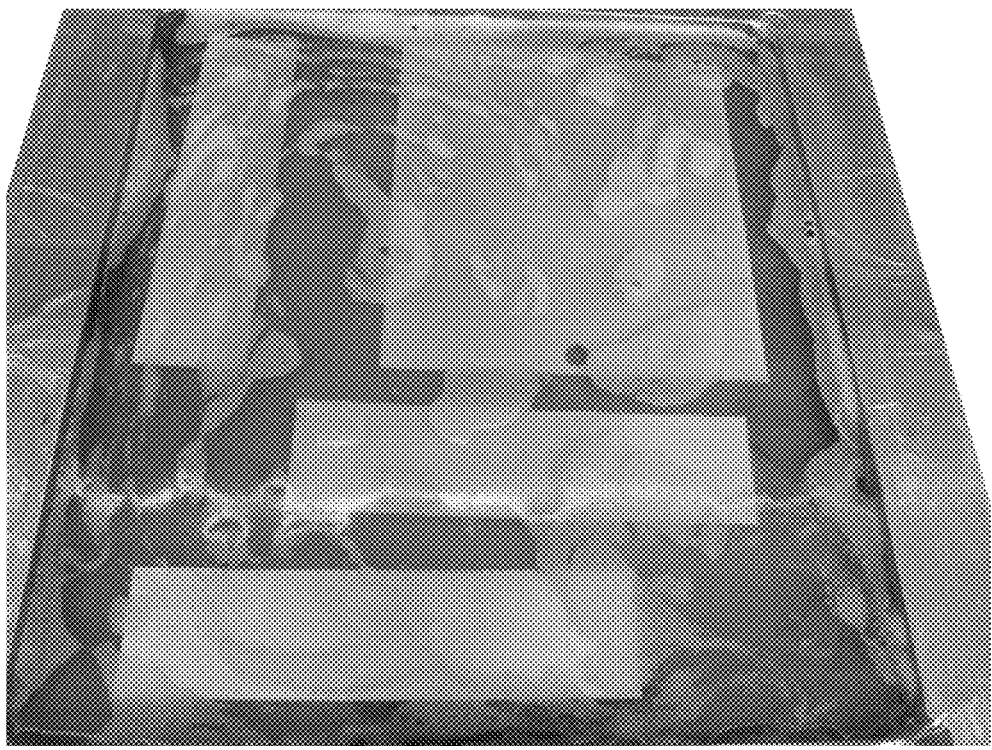
FIGS. 4A, 4B, 5A to 5C, 6A to 6C, 7A, and 7B are photographs showing various corrosion tests being performed.
Figure 4B:
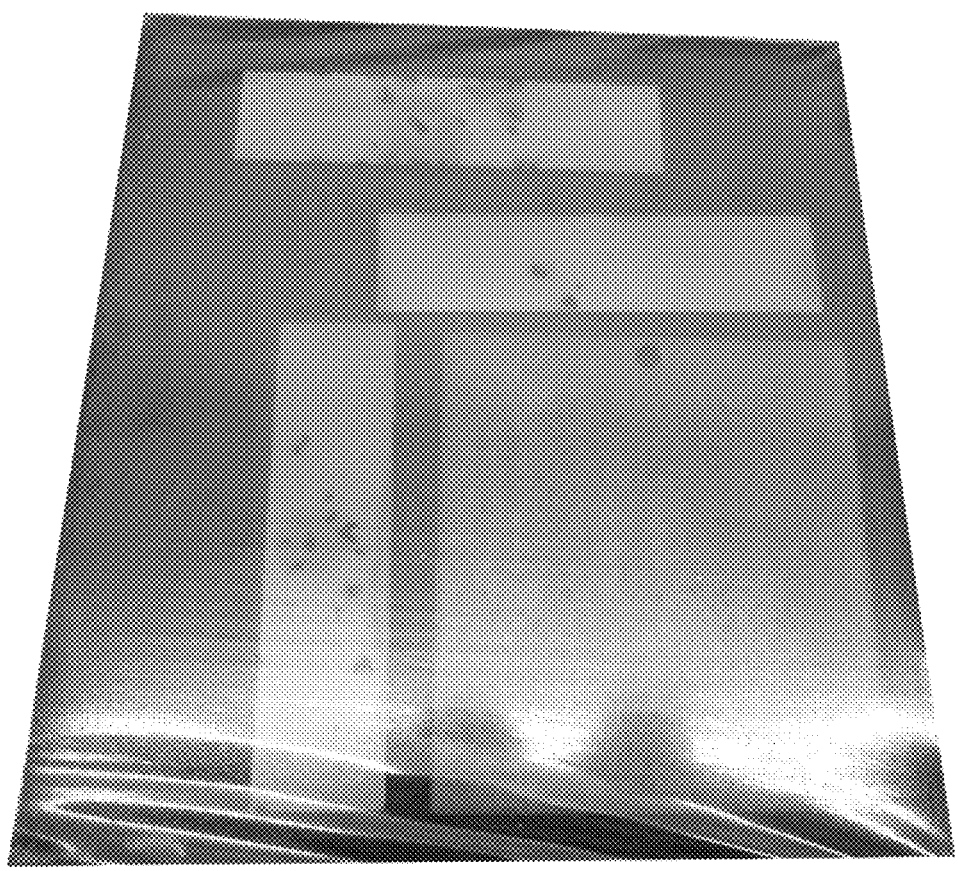

Corrosion pit variation was monitored for 8 h. FIGS. 4A (t=0 h) and 4B (t=8 h) show this variation, and from them it can be seen that the corrosion resistance of the coated substrate can be evaluated in a length of time that is significantly shorter than the time required for a salt spray test.

Example 2: Implementing a Liquid Composition Including a Color pH Indicator Based on Red Cabbage (Natural Dye)

The following experimental procedure was performed in order to determine the impact of temperature aging on the coating formed by Alodine 1200 treatment on an aluminum substrate (alloy 7010). Alodine 1200 treatment is chemical conversion treatment based on hexavalent chromium.

The corrosion resistance of various testpieces was evaluated by using a corrosion-accelerator gel as described in Example 1. The tested samples were as follows:
a bare sample of 7010 alloy for reference;
three samples of 7010 alloy treated with Alodine 1200 treatment;
three samples of 7010 alloy treated with Alodine 1200 treatment and aged for 100 h at 65° C.; and
three samples of 7010 alloy treated by Alodine 1200 treatment and aged for 100 h at 125° C.

Figure 5A:
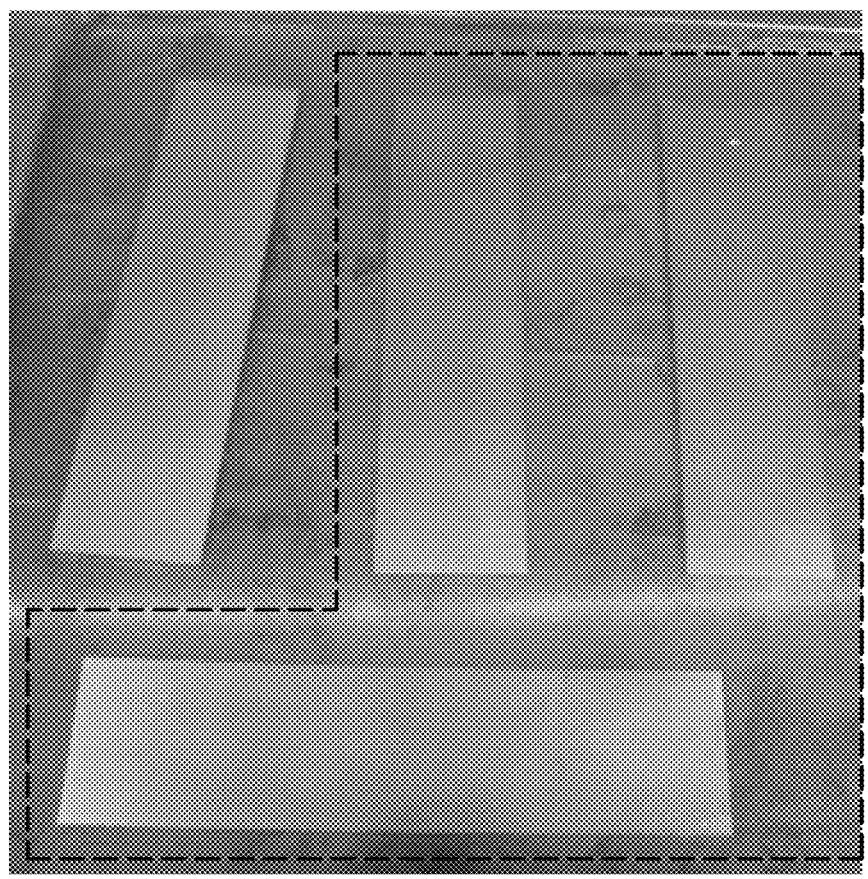
Figure 5B:
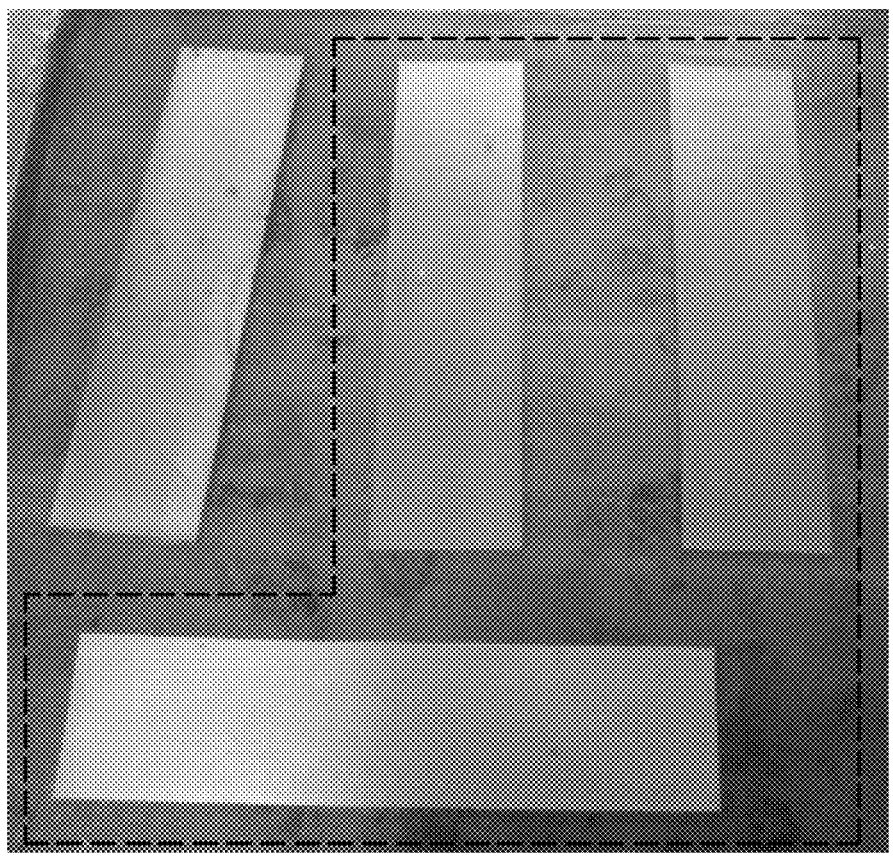
Figure 5C:
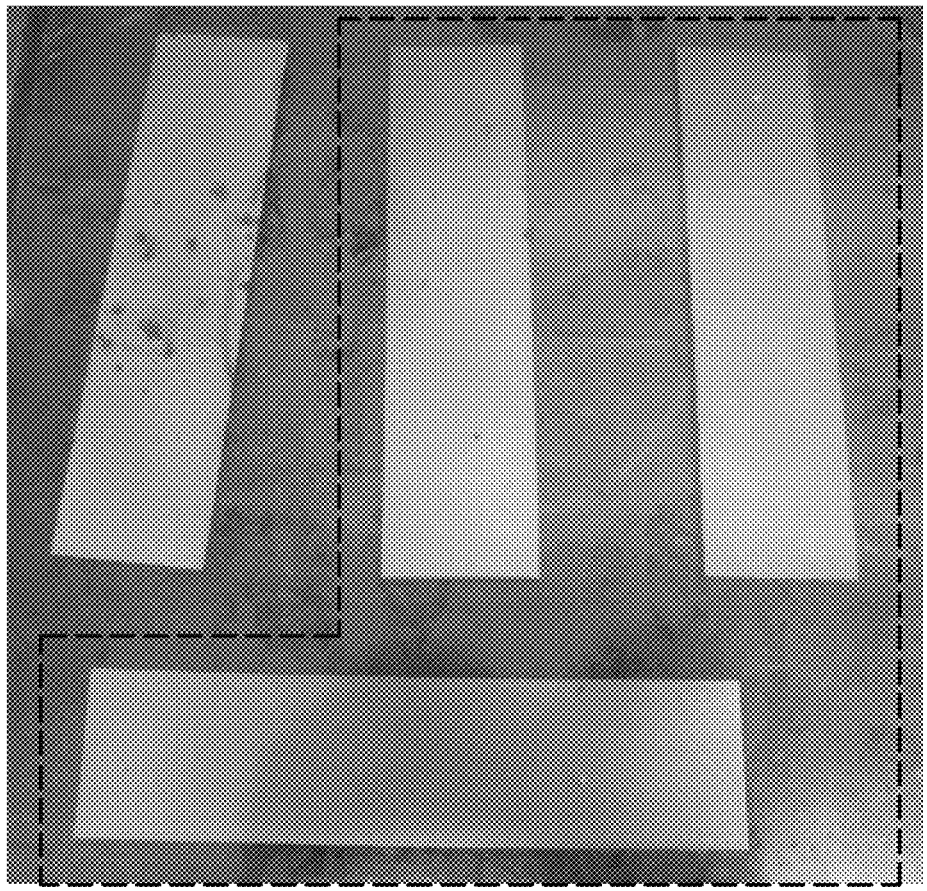

FIGS. 5A to 5C show the results obtained for the reference sample (not in the box) and the non-aged coated samples (in the box). FIG. 5A is a photograph at the beginning of the corrosion test. FIG. 5B shows the result obtained after 22 h, and FIG. 5C shows the result obtained after 48 h.

Figure 6A:
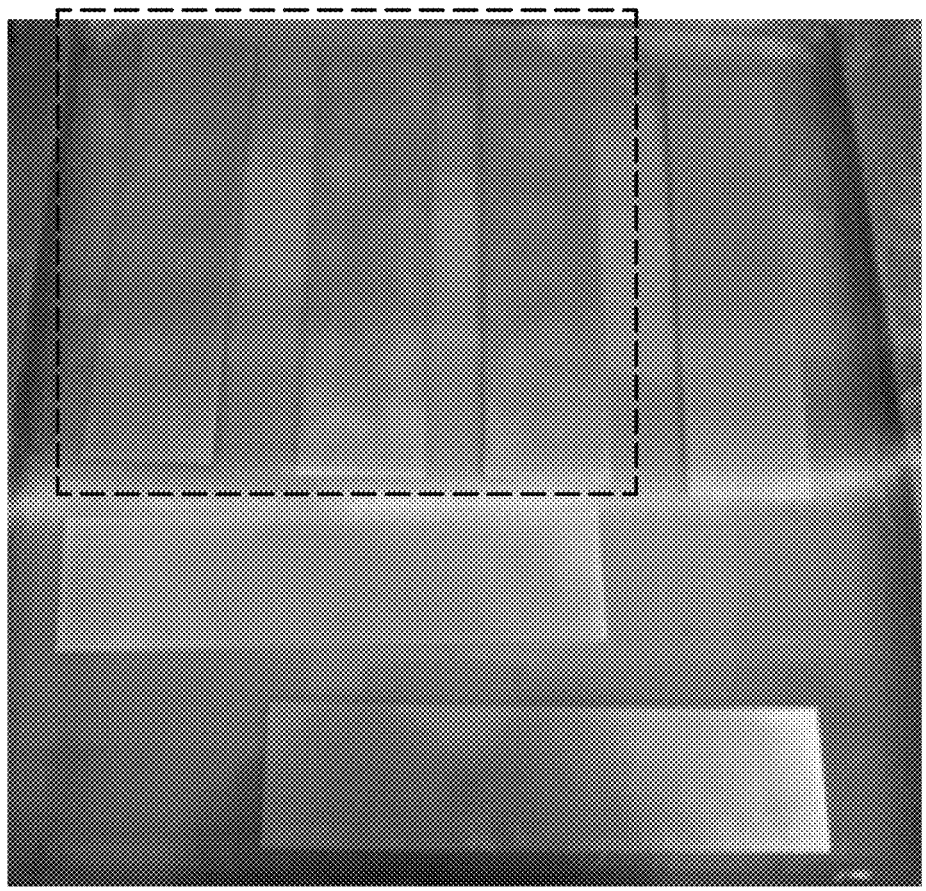
Figure 6B:
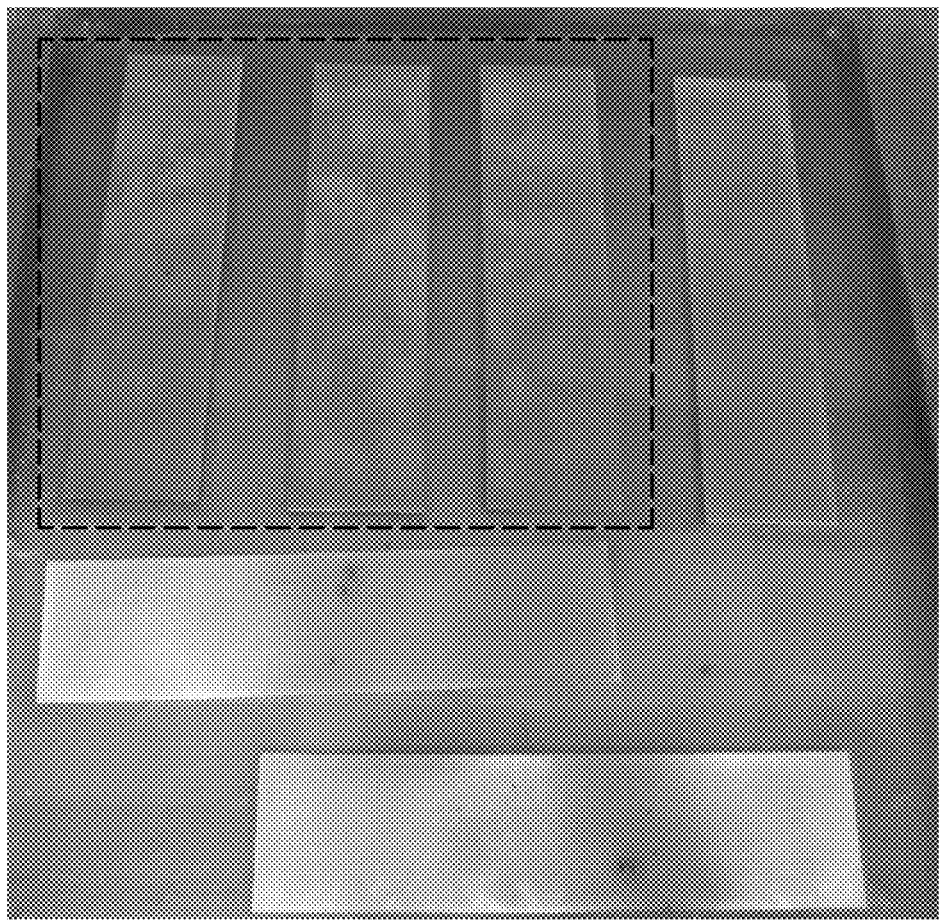
Figure 6C:
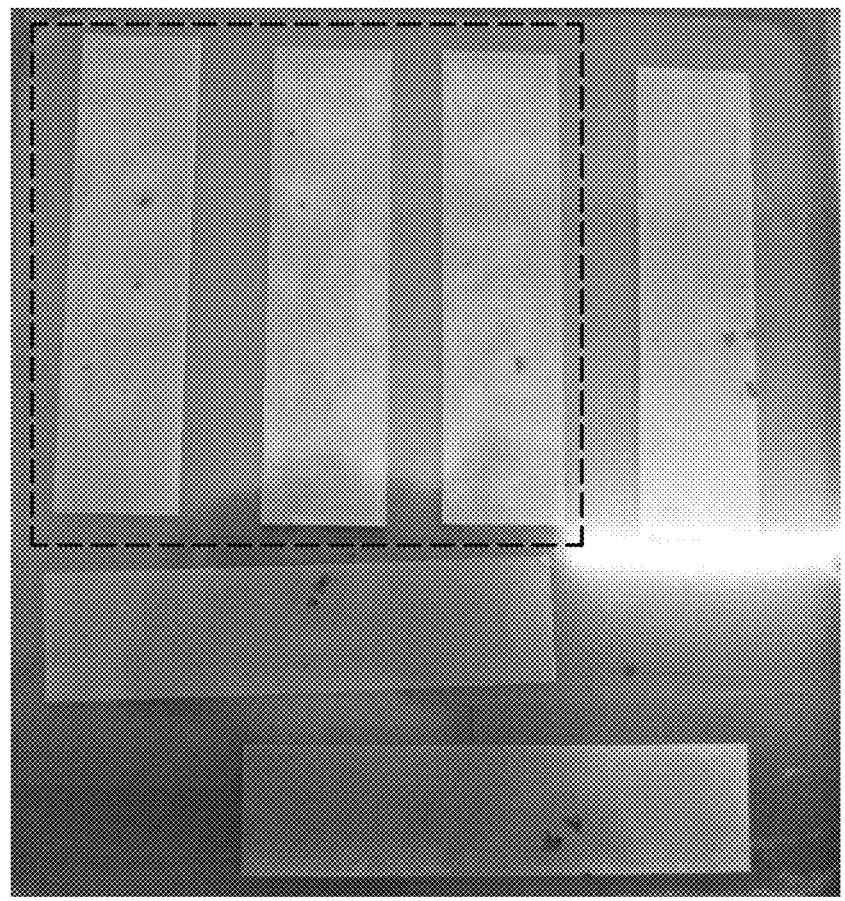

FIGS. 6A to 6C show the results obtained for samples aged at 65° C. (in the box) and for samples aged at 125° C. (not in the box). FIG. 6A is a photograph at the beginning of the corrosion test. FIG. 6B shows the result obtained after 22 h, and FIG. 6C shows the result obtained after 48 h.

Immediately after applying the gel, violet zones appeared locally on the bare substrate, showing that corrosion reactions had begun to take place. Later on, points appeared on the testpieces aged at 125° C. rapidly followed by local violet coloring. Thereafter, pits were formed on the testpieces aged at 65° C. Corrosion pits appeared on the non-aged samples in less than 24 h.

The gel thus makes it possible to compare the resistance of the various coatings by referring to the number of corrosion pits that appear at the end of a given length of time.

Example 3: Implementing a Liquid Composition Including a Commercial Color pH Indicator A gellable liquid composition was prepared as follows:

23.22 g of sodium chloride (NaCl) were added to 100 mL of demineralized water and were dissolved under vigorous stirring;

once the salt had dissolved, a commercial color indicator sold by the supplier Merck under the reference 1.09175.1000 (universal pH indicator for pH in the range 4.00 to 10.00) was added at a concentration of one drop of color indicator per mL of water;

0.43 g of agar-agar powder provided by the supplier Alfa Aesar were then added cold by being dusted gently; and the temperature of the resulting mixture was then raised progressively up to 100° C. in order to encourage dissolution of the agar-agar.

The mixture obtained at the temperature of 100° C. was immediately poured onto testpieces constituted by a 7010 aluminum alloy covered in a layer obtained by chemical conversion treatment based on trivalent chromium. The testpieces were present in a support enabling the gel to be poured into it. The testpieces and the support had previously been degreased.

The mixture as applied in that way was then allowed to cool for about 5 min to ambient temperature in order to be gelled so as to obtain a corrosion-accelerator layer having a thickness of about 1 mm. The support containing the testpieces and the gel as formed in this way was covered in a plastics film in order to avoid the gel dehydrating.

Figure 7A:
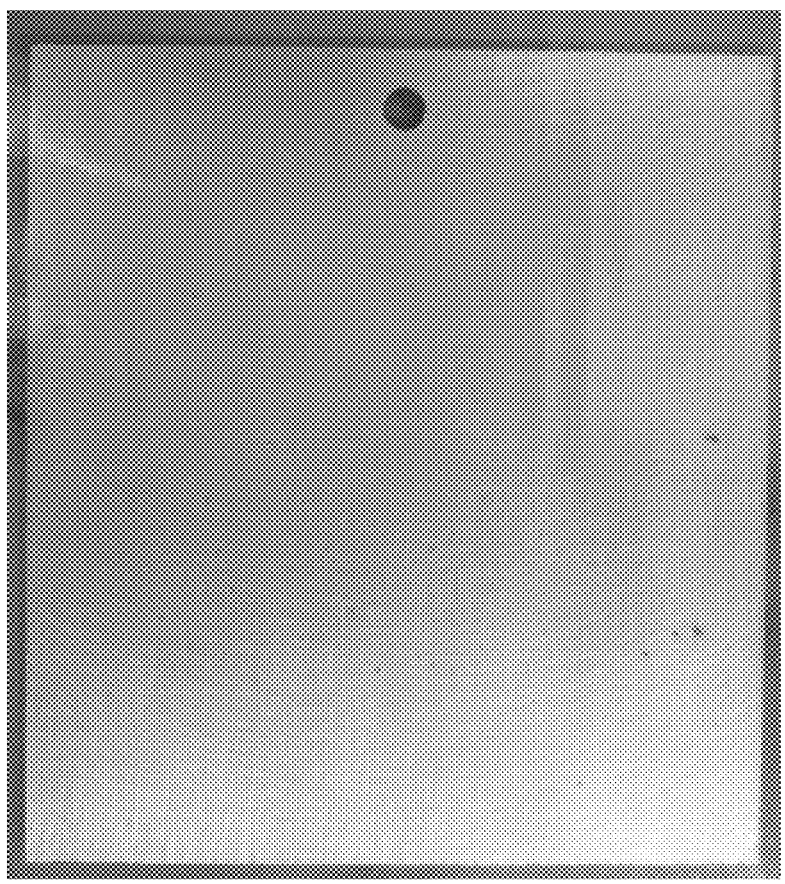
Figure 7B:
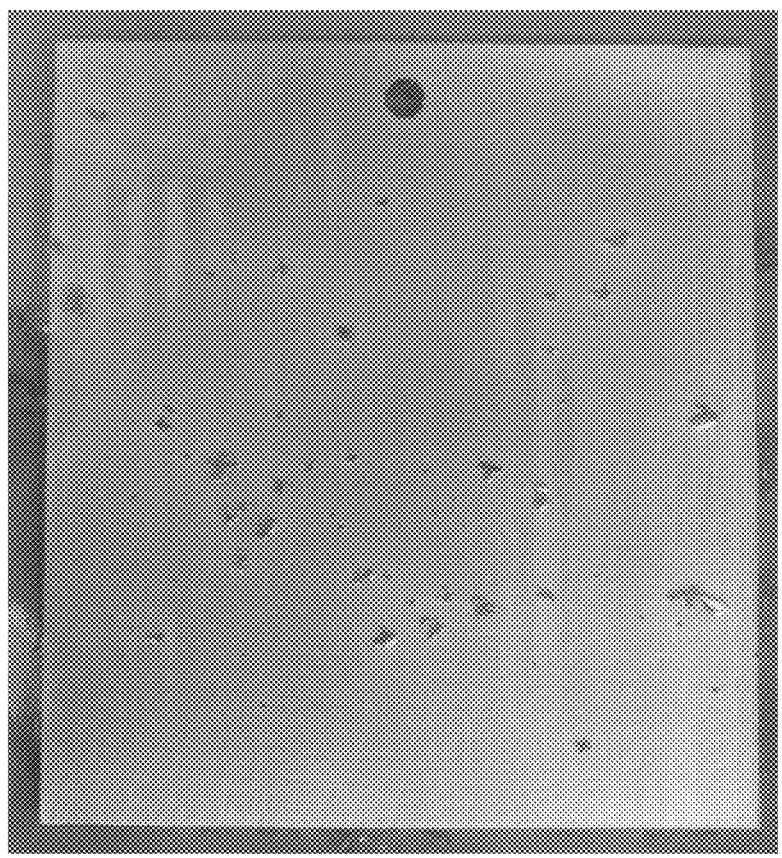

Corrosion pit variation was monitored for 22 h. FIGS. 7A (t=5 h) and 7B (t=22 h) show this variation, and from them it can be seen that the corrosion resistance of the coated substrate can be evaluated in a length of time that is significantly shorter than that of a salt spray test.

The term "lying in the range . . . to . . . " should be understood as including the bounds.

The invention claimed is:

1. A method of evaluating the corrosion resistance of a coated metal substrate, the method comprising:
    putting a liquid composition into contact with a corrosion protection coating present on the surface of a metal substrate, the liquid composition comprising water, a gelling agent, corrosion-catalyst ions, and a color pH indicator;
    gelling the liquid composition in order to form a corrosion-accelerator gel in contact with the coating such that the coating is in contact with the corrosion-accelerator gel and with the metal substrate and the coating is between the metal substrate and the corrosion-accelerator gel, the corrosion-accelerator gel including said corrosion-catalyst ions and said color pH indicator;
    after said gelling, performing a corrosion test during which the corrosion-accelerator gel that has formed is left in contact with the corrosion protection coating; and
    evaluating the corrosion resistance of the substrate coated by the corrosion protection coating by observing a change in the color of the color pH indicator present in the corrosion-accelerator gel after performing the corrosion test wherein no change in the color indicates no corrosion and a change in the color indicates corrosion.

2. A method according to claim 1, wherein the corrosion-catalyst ions are selected from: chlorine ions, sulfide ions, sulfate ions, fluoride ions, and mixtures thereof.

3. A method according to claim 1, further comprising, before putting the liquid composition into contact with the coating, a step of forming the corrosion protection coating on the metal substrate by performing at least one of the following treatments: chemical conversion treatment; anodizing treatment; depositing a corrosion protection paint; a sol-gel method; cadmium plating; depositing a zinc-nickel coating.

4. A method according to claim 1, wherein the concentration of corrosion-catalyst ions in the liquid composition lies in the range 4 mol/L to 6 mol/L.

5. A method according to claim 1, wherein the volume content of color pH indicator in the liquid composition lies in the range 2% to 15%.

6. A method according to claim 1, wherein the concentration of the gelling agent in the liquid composition lies in the range 1 g/L to 200 g/L.

7. A method according to claim 1, wherein the metal substrate comprises aluminum.

8. A method according to claim 1, wherein, during the corrosion-test, the corrosion-accelerator gel is left in contact with the corrosion protection coating in a container that is closed to hold the corrosion-accelerator gel and the coated substrate in a sealed chamber.

9. A method according to claim 8, wherein the container is closed by a transparent wall.

10. A method according to claim 8, wherein the container is closed by a wall of plastic material.

\* \* \* \* \*